United States Patent [19]
Herve

[11] Patent Number: 5,889,911
[45] Date of Patent: *Mar. 30, 1999

[54] PRECISION MACHINED WARPED WAVEGUIDE WAFER

[75] Inventor: Patrick Jean Pierre Herve, Avon, France

[73] Assignee: Corning, Inc. U.S.A., Corning, N.Y.

[*] Notice: The terminal 9 months of this patent has been disclaimed.

[21] Appl. No.: 309,269

[22] Filed: Sep. 20, 1994

[30] Foreign Application Priority Data

Sep. 28, 1993 [EP] European Pat. Off. ............. 93402366

[51] Int. Cl.⁶ ..................................................... G02B 6/13
[52] U.S. Cl. ............................................. 385/129; 83/875
[58] Field of Search ............................ 385/14, 129–132, 385/146; 219/121.67, 121.68, 121.69, 121.72, 121.85; 83/875–877

[56] References Cited

U.S. PATENT DOCUMENTS

| | | | |
|---|---|---|---|
| 3,967,878 | 7/1976 | Caton | 385/132 X |
| 4,492,362 | 1/1985 | Garcia, Jr. et al. | 251/363 |
| 4,534,096 | 8/1985 | Garcia, Jr. et al. | 29/890.122 |
| 4,783,136 | 11/1988 | Elman et al. | 385/130 |
| 4,785,161 | 11/1988 | Strom | 219/121.69 |
| 4,835,361 | 5/1989 | Strom | 219/121.85 |
| 4,999,686 | 3/1991 | Autier et al. | 385/130 X |
| 5,119,706 | 6/1992 | Poletti | 83/455 |
| 5,136,678 | 8/1992 | Yoshimura | 385/132 |
| 5,399,049 | 3/1995 | Abe et al. | 83/875 X |

*Primary Examiner*—John D. Lee
*Attorney, Agent, or Firm*—William J Chervenck

[57] ABSTRACT

A method of precision machining at least one cut into an article having a non-uniform surface, wherein the cut is of substantially constant depth relative to the non-uniform surface. One aspect of the invention is a machined optical wafer having two adjacent notches, to serve as a platform for a fiber optic pigtail, machined into the edge of the wafer. Another aspect of the invention is a method of automatically machining a plurality of notches into an optical wafer. For optical wafers having embedded light paths, light detected from these light paths may be used to compensate for the variation in embedded depth of the light paths.

5 Claims, 3 Drawing Sheets

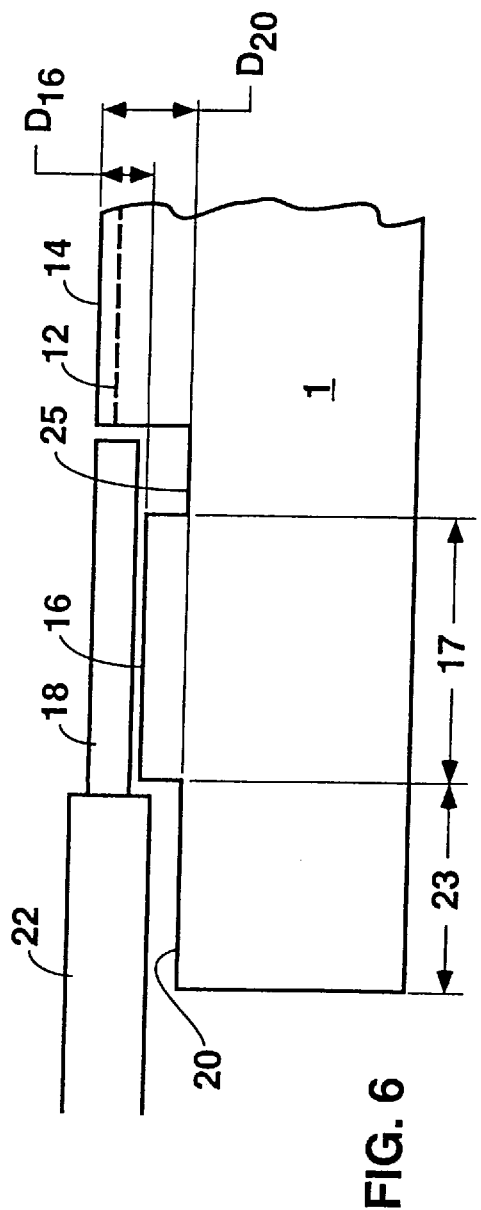
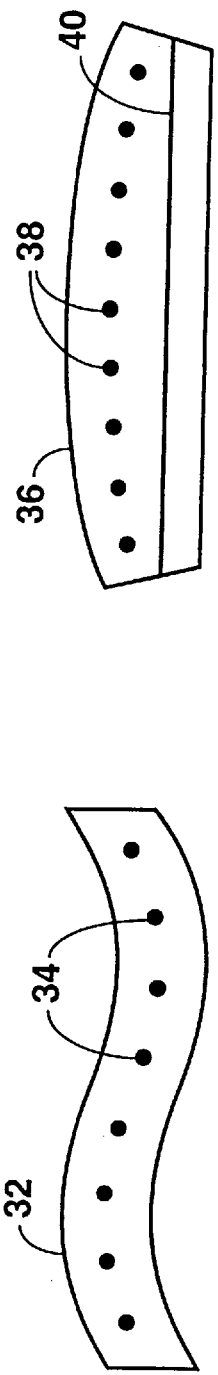

5,889,911

PRECISION MACHINED WARPED WAVEGUIDE WAFER

BACKGROUND OF THE INVENTION

The present invention relates to a precision machined article and a method of precision machining an article. More specifically, the invention relates to a precision machined optical wafer and a method of precision machining an optical wafer.

Due in large part to an increasing demand for very accurately machined parts, precise, automated machining has become a wide and diverse field of endeavor. The relationship between dimensional tolerance of machined parts and the life expectancy and performance of those parts was recognized early in the development of the art. Parts machined to tight tolerances generally offered better performance and were found to last longer. To meet the demand for precision parts, a machining art based upon sensors coupled to automatic machine controllers has developed.

In U.S. Pat. No. 4,954,022, Underwood et al., a workpiece of known shape is positioned on a moveable table beneath a movable tool. See col. 1, ll. 45–65. The tool is moved into electrical contact with the workpiece and the spatial location of the contact point relative to a reference position is recorded. The tool then bores a hole of preset depth into the workpiece. See col. 2. ll. 39–45. A computer compares the recorded point of contact to the expected point of contact. The expected point of contact is based upon the known shape of the workpiece and its known initial position on the table. The tool retracts, moves to a second point on the workpiece and makes electrical contact with the workpiece. The difference between expected point of contact is compared to the actual point of contact at each position where a hole is to be bored to insure uniform depth of the holes, ". . . the exact positions of the workpiece with respect to the expected positions of the workpiece are displayed to insure that each subsequent cut was made to the same uniform depth as the previous cuts in the workpiece." (Col. 2, ll. 21–25.) The ideal end product is a workpiece having a set of holes of uniform depth, each hole centerline having a preset angular relation to the other hole centerlines.

The machining proceeds in a stepwise way: the entire surface is not sensed and fitted prior to the start of machining operations.

Some drawbacks associated with this machining strategy are: an expected shape of the workpiece must be known and entered into the computer; precision positioning is required for both the tool and the workpiece; multiple degrees of freedom of both the tool and the workpiece are needed to complete the machining task; and, particular precautions must be taken to avoid a false electrical contact signal. These precautions include flushing the surface with a dielectric liquid, a step which is not compatible with some materials and processes. See col. 2, ll. 57–68.

An automated grinding method using sensor feedback throughout the operation is described in U.S. Pat. No. 3,665,652, Gordon et al. The method employs sensing means, a controller and a computer to determine ". . . the amount of material removed from the workpiece. " (Col. 1, l. 44). A comparison of sensor signals and D/A convertor signals yields ". . . the degree of out of round of the workpiece . . . " . (Col. 1, l. 39). Also, circuitry is in place ". . . for generation of a signal representing the rate of removal of material from the workpiece." (Col. 1, ll. 46–48). This patent exemplifies a relatively complex sensing and controlling system. In general, as complexity of the automatic machining system and number of parameters controlled or monitored increases, cost and, in some cases, machine downtime may be expected to increase.

In U.S. Pat. No. 4,636,960, McMurtry, "measuring operations are needed before machining to determine the position of a surface to be machined and after machining to check the dimensions of the machined surface." (Col.1, ll. 26–29.) The initial position of the workpiece is determined relative to, "test surfaces on the table on or adjacent to the workpiece". (Col.1, ll. 49–51.) An additional reference is required. "The workpiece has a datum bore having an axis defining the workpiece datum in the X,Y directions. The datum position of the workpiece on the table is defined by distances [X,Y,Z] between the axis and the table datum surfaces TX, TY, TZ." (Col.2, ll. 29–34.) (Numbers referring to figures have been suppressed.) Before machining begins, "the work offset [see col. 2, ll. 29–58] and the probe offset [see col. 3, ll. 3–17] have to be taken into account." The tool can then be directed to move to a target position, taking into account the probe and workpiece offsets.

The problem of relating a probe position signal to an actual tool axis position adds appreciable complexity to the machine and complication, time and expense to its operation. Two sets of reference surfaces are required, TX,TY,TZ and the datum bore, and two sensing operations, before and after machining are stipulated. The machine is made more expensive and complicated by the requirement that position of the workpiece relative to the support table and relative to the tool be known. Furthermore, the accuracy and repeatability of machining is necessarily determined by the accuracy and repeatability of the tool moving and table moving mechanisms.

U.S. Pat. No. 5,136,224, Matsumura, et al., describes a method of detecting and reducing to numerical data a model surface through use of a stylus which contacts the model. "A method of creating NC data for performance of machining in accordance with the profile of a model is available and includes tracing the surface of the model with a stylus by means of tracer control, digitizing the model surface profile by accepting stylus position data at a predetermined period T, and creating the NC data using the digitized data." The NC data may be used subsequently to machine a workpiece in conformance with the surface acquired from the model. Both position and velocity data are taken from the stylus and digitized. (Col. 1, ll. 57–60.)

Again, in this case a separate apparatus, i.e., a stylus is used to take data on the surface. Also, the complication of using velocity data is introduced. And, the surfaced measured corresponds with the final machined surface, not a surface to be machined.

The above examples show that increased accuracy is obtained at the expense of:

(i) increased time to complete a machining operation; and, (ii) increased complexity of the equipment used to model the surface and control the actual machining step.

Precision machining difficulties are compounded when the shape of the workpiece is irregular or when the amount of material to be removed from the workpiece is small. For example, optical wafers, which incorporate embedded optical waveguide paths, can be machined to create a surface for securing an optical fiber pigtail whose endface is abutted to the embedded path. In a manual prior art process, labor intensive and time consuming steps are required to achieve acceptable alignment of the fiber pigtail and the embedded waveguide path. First, the wafer is cut into several pieces to reduce the deviation from flatness within a wafer piece. The individual pieces are attached by means of wax to flat substrates in preparation for machining. While the wax hardens, the operator adjusts the position of the wafer piece manually in an attempt to place the piece in a horizontal plane relative to the downward direction of movement of a tool. The piece is then machined by moving the tool through the wafer piece while maintaining the vertical position of the tool. Even with exceptional care in segmenting the wafer and aligning the wafer pieces relative to a horizontal plane beneath the tool, machining results are sometimes unsatisfactory. In FIG. 8, the edge view of an optical wafer 36 shows varying distances between the machining line 40 and the location of the embedded waveguide paths 38.

There is, therefore, a need for a precision machining method which is lower in cost, simpler in concept and operation, and which is able to accept a wider range of workpiece sizes and shapes. More particularly, there is a need for a precision machining system which does not require pre-knowledge of the surface shape and which does not require precise reference points or surfaces for both tool and workpiece. Also, a precision machining strategy which automatically takes into account tool wear, is a desirable machining method enhancement.

SUMMARY OF THE INVENTION

The term cut refers to the action or result of a tool removing material from a workpiece. The term notch refers to a type of cut, wherein the cut is substantially straight and has a cross section in which a horizontal portion is substantially flat. The horizontal portion may form, with one or two side walls, either a plateau, e.g., 16 in FIG. 6, a corner, e.g., 20 in FIG. 6, or a channel, e.g., 25 in FIG. 6.

The present invention overcomes the limitations of the prior art stated above and meets the-need for a precision machining system lower in cost and simpler in concept and design.

More specifically, the present invention meets the need for a machining method:
  which does not require knowledge of the workpiece surface shape prior to locating the surface with a sensor/detector arrangement;
  in which position data is referenced to a single reference position of the tool so that precision holding or chucking of the workpiece is not required; and,
  which automatically takes into account tool wear by using the tool as the probe.

One aspect of the invention is a machined article, having a non-uniform surface, comprising at least one cut made into the surface, wherein the cut depth relative to the surface is substantially constant. The cut width is determined by the tool size and the number of passes made along the cut length.

One embodiment of the invention is a machined optical wafer, having a non-uniform surface, comprising a first and a second notch, said notches having a first and second constant depth relative to the surface. The first notch is machined into the wafer along one edge of the wafer. The second notch is machined into the wafer adjacent to the first notch and has a depth less than the first notch. Thus, the two notches machined in this manner form two steps arranged in ascending order from the wafer edge. These two steps may serve as a platform for attaching fiber optic pigtails to the wafer as disclosed, for example, in U.S. Pat. No. 4,765,702, Dohan et al. FIG. 6 is a side view of this embodiment showing first notch 20 and second notch 16. A preferred depth $D_{16}$ in this embodiment is about 120 microns, which allows for the target radius of the bare optical fiber and for an adhesive layer.

Another aspect of the invention is a method for machining a cut into a surface wherein the surface is non-uniform and the depth of the cut relative to the surface is controlled to a target value. The method comprises the steps of,
  a) holding the article in place relative to a reference position of the cutting tool,
  b) moving the cutting tool into contact with the surface of the article,
  c) detecting the position of contact of the tool with the surface,
  d) recording the position of the contact of the tool with the surface,
  e) retracting the tool from the surface,
  f) moving the tool to a different position on the surface,
  g) repeating steps b) through f) at multiple positions on the surface, and
  h) machining at least one cut into the surface, wherein the machining is controlled by control means using positions recorded in the recording step.

The positions of contact between tool and workpiece surface are measured relative to the reference or home position of the tool. In one embodiment of the method, the recorded positions lie along a line so that the cut made using these recorded positions is substantially a notch.

In a preferred embodiment of the invention, the means for detecting the contact between tool and surface is an ultrasonic detector attached to the device holding the article. The contact generates an ultrasonic wave which is transmitted to the detector. The ultrasonic detector generates a signal which is recorded. The means for recording the contact signals is connected to machine controlling means, which includes computing means to fit a curve to the recorded contact positions. During machining of a cut, the controlling means controls the movement of the tool to essentially make a cut along the fitted curve.

A further aspect of the inventive method, wherein the article to be machined is an optical wafer with embedded light paths, is contemplated. This aspect of the invention includes the steps,
  moving a detector to detect light emanating from light paths embedded in the wafer, and
  recording the location of the detector relative to the cutting tool reference position.

The tool contact detected by the ultrasonic sensor is used to locate the surface of the wafer. The light sensor is used to locate the light path relative to the wafer surface. This information may be used to calculate a curve fit to the contact points which compensates for variations in the embedded depth of the light paths.

BRIEF DESCRIPTION OF THE DRAWINGS

FIG. 6 is a side view illustration of an embodiment of the invention wherein the machined notches in an optical wafer form a platform for attaching optical fiber pigtails aligned with optical paths in the wafer.

FIG. 7 is an edge view of an optical wafer having a warped surface.

FIG. 8 is an edge view of an arcuate optical wafer showing the variable distance between embedded optical paths and a machined notch which lies in a horizontal plane.

DETAILED DESCRIPTION

It will be understood that the drawings are illustrative of the invention and are useful in the description thereof, but are not necessarily intended to depict the entire invention or the relative sizes of the parts of the invention.

In a process for manufacturing an article, which subsequently will undergo one or more machining steps, it is not unusual that the article may be distorted through such mechanisms as thermal cycling or uneven loading during shaping steps. An example of such an article, subject to distorting forces during manufacture, is a glass wafer with optical waveguide paths created by ion exchange in a wafer surface layer. In certain steps of manufacture, the wafer body is raised to temperatures of about 300° C. to 400° C. Since the "optical wafer" is typically composed of a substrate with an ion exchanged surface layer, the dissimilar expansion coefficients of the different materials can produce a non-uniformity or warpage in the wafer when it is cooled to room temperature.

Another method of wafer manufacture is chemical vapor deposition, wherein a multi-layer wafer is formed by photolithographic masking and deposition on a substrate. In this method, too, non-uniformity of the wafer can result from a high temperature step such as the deposition or consolidation step.

Figure 1:
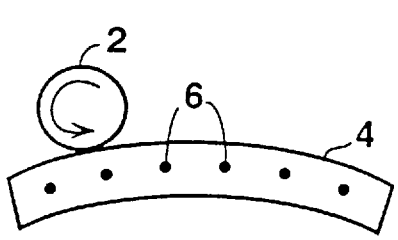
FIG. 1 is an edge view illustration of an optical wafer having an arcuate surface. A cutting tool is shown above the wafer.

FIG. 1 is an end view illustration of an optical wafer having a warped arcuate surface 4. FIG. 7 shows a more general non-uniform surface 32 with embedded light paths 34. The following discussion may be applied to either surface shape. Embedded in the wafer are optical paths 6, which, in general, traverse a wafer dimension. These optical paths typically are embedded at a given depth below a surface of the wafer, although some variation in depth of embedding is inherent in the process. In order to incorporate the optical wafer into a light circuit having optical fiber components, an optical fiber pigtail is aligned with an optical path in the wafer and fixed in place to receive light from the wafer optical paths. U.S. Pat. No. 4,979,970, Dannoux et al., describes optical wafer having optical fiber pigtails. Making the connection between the optical path output and the fiber endface presents a difficult precision machining problem, because the fiber itself is secured to the machined surface in conjunction with endface/output alignment.

To minimize light loss at the endface/output junction, the fiber core region must be substantially centered with respect to the optical path output from the wafer. The cross sectional dimensions of the wafer optical path and the fiber core region are on the order of 5 to 10 microns. The depth to which the optical path is embedded in the wafer is 5 to 10 microns. Total variability of embedded depth of the optical paths in the wafer can be +/− 3 microns. The tolerance on the outer glass diameter of the pigtail is +/− 1 to 2 microns. And, warpage of the wafer can be as much as 40 to 50 microns over a wafer dimension of 40 to 60 millimeters.

Based on these tolerances, the offset of the fiber core center from the wafer lightpath center can be as much as +/− 5 microns. This offset may be reduced by varying the thickness of the adhesive binding the pigtail to the wafer. However, there are practical limits on the adhesive thickness, which limits require the machining step tolerance to be about +/− 2 microns. In addition, a thinner glue layer between substrate and pigtail minimizes sensitivity of the endface/output joint to environmental changes. Furthermore, the machining must account for warpage of the wafer in order to realize acceptable coupling of light between the fiber and the wafer optical path. Also, holding the tight machining tolerance and compensating for the wafer non-uniformity facilitates automatic pigtail alignment. It was noted above in describing the manual prior art that the wafer was segmented before machining. Maintaining the wafer in one piece enhances the automated operation.

Figure 2:
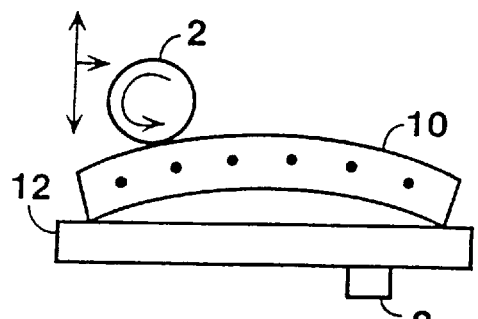
FIG. 2 shows the optical wafer on a holding device to which an ultrasonic detector is attached. A cutting tool is shown above the wafer.

FIG. 2 shows a wafer, having a warped, arcuate surface 10, fixedly positioned on a holder 12. The method for holding the wafer in place is conventional and is not shown. The holder position is fixed relative to the reference position of the tool. A rotating cutting tool 2 is shown above the warped surface. An ultrasonic detector 8 is attached to holder 12. Ultrasonic detectors, such as quartz crystals, are known in the prior art. These detectors have been used, for example, to improve machine utilization by detecting contact between tool and workpiece. A fast tool feed rate toward the workpiece is used prior to contact and, upon receiving a contact signal from the detector, a control means slows the tool feed rate as it begins to remove material from the workpiece.

The arrow pattern at the left of FIG. 2 indicates the tool is free to move relative to the wafer surface. As the tool moves, the control system, diagrammed in FIG. 3, tracks and records the x,y,z position of the tool. When the tool is moved into contact with the wafer surface, a high frequency compressional wave, i.e., an ultrasonic wave, is generated and is received by detector 8. For example, the ultrasonic wave may pass from the workpiece to holder 12 and on to detector 8. Detector 8 converts the ultrasonic wave energy into an electrical pulse which is received by conventional recording means, shown as 9 in FIG. 3.

Figure 3:
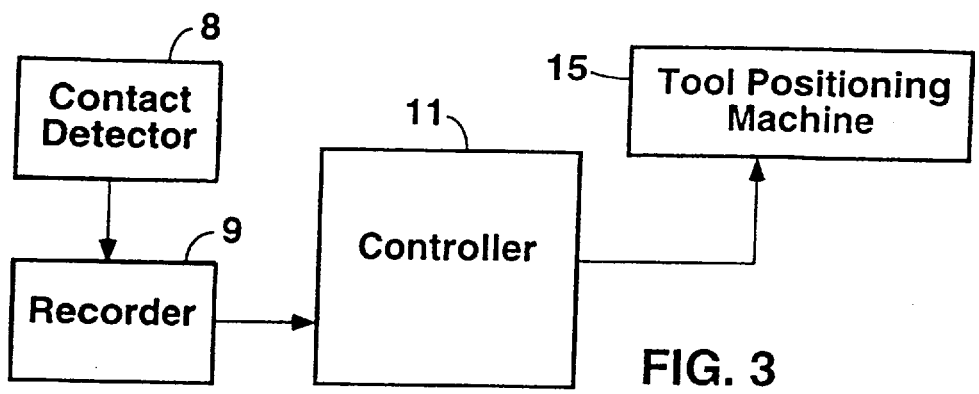
FIG. 3 is a block diagram illustrative of the steps of detecting the surface position, recording the position, and controlling the tool.

The block diagram of FIG. 3 shows the flow of information into the machine control system. Detector 8 sends a signal indicating that a contact between tool and surface has occurred. This signal is received by recorder 9 and sent on to controller 11. Controller 11 stores the point of contact and labels it with coordinates $x_i, y_i, z_i$, measured with respect to the tool reference position, $x_o, y_o, z_o$. For a linear cut one of the three coordinates, which may be chosen as the y coordinate, is held constant. Tool 2, shown in FIG. 2, is retracted and moved to a new point on the wafer surface where another contact is made and another surface point stored and labelled in controller 11. Successive contact points are stored and labelled so that controller 11 can fit a surface to the points of contact. In general, as the number of contact points increases, the fitted surface more closely approximates the actual wafer surface.

At the end of the surface fitting step, machining begins. Controller 11 sends position instructions to tool positioner 15. In general, the position instructions include a start position, an end position and a depth. Hence, a cut or notch of varying preset depth relative to the contact positions may be made in the wafer. Because the contact positions or points represent the surface of the article, the cut has a depth which is measured relative to that surface. The tolerance of the cut depth relative to the surface may be made to meet substantially any specified tolerance by increasing or decreasing the number of contact points recorded to generate the fitted surface.

The position of the tool, during the process of machining, is retained in controller 11. Thus, controller 11 may feed successive instructions to the positioning machine so that the tool makes a piecewise continuous cut in the surface, wherein the start point for the n+1 segment of the cut is based upon the end point of the n segment of the cut.

Figure 4:
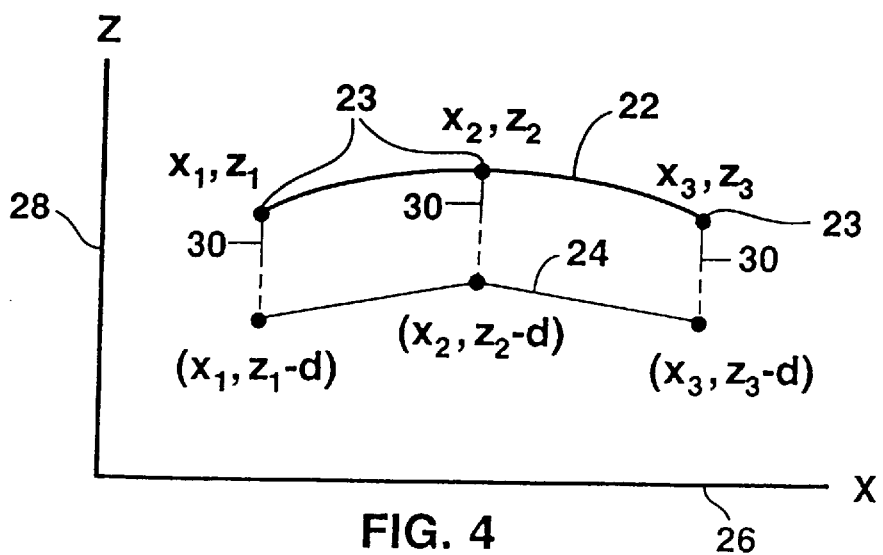
FIG. 4 is a graphical representation of the path taken by the tool in cutting a notch having a preset depth relative to the wafer surface.

FIG. 4 graphically illustrates an end view of a preferred embodiment of the invention, wherein the contact points lie along a line on the wafer surface. The line representing the actual wafer surface 22 is drawn in the z,x coordinate system, with z axis 28 and x axis 26. Three contact points 23 are shown in the z,x coordinate system, where the $z_i$, $x_i$ designations are made relative to a reference position of the tool, $z_o$, $x_o$, as described above. Curve 24 represents the curve fitted to the contact points. A target depth $D_n$, denoted 30 in FIG. 4, is entered into computer 11 of FIG. 3. The tool is then instructed to make a cut, having a depth $D_n$, 30, which follows curve 24. If curve 22 varies along axis 28 by more than a few microns over a distance, along axis 26, of a few millimeters, additional contact points may be required to achieve the desired tolerance on Dn, 30, relative to the surface 22. As a result of the practice of this invention, the distance 30 between curves 22 and 24 may be held substantially constant over the x-axis traverse 26. In contrast to the prior art, only one preset reference point, that of the tool 2 of FIG. 2, and only one reference surface, that of the workpiece or wafer surface, are required. If the wafer surface represented by 22 varies only a few microns over the entire x-axis traversed, then fewer points of contact are required to meet target tolerance on $D_n$.

Figure 5:
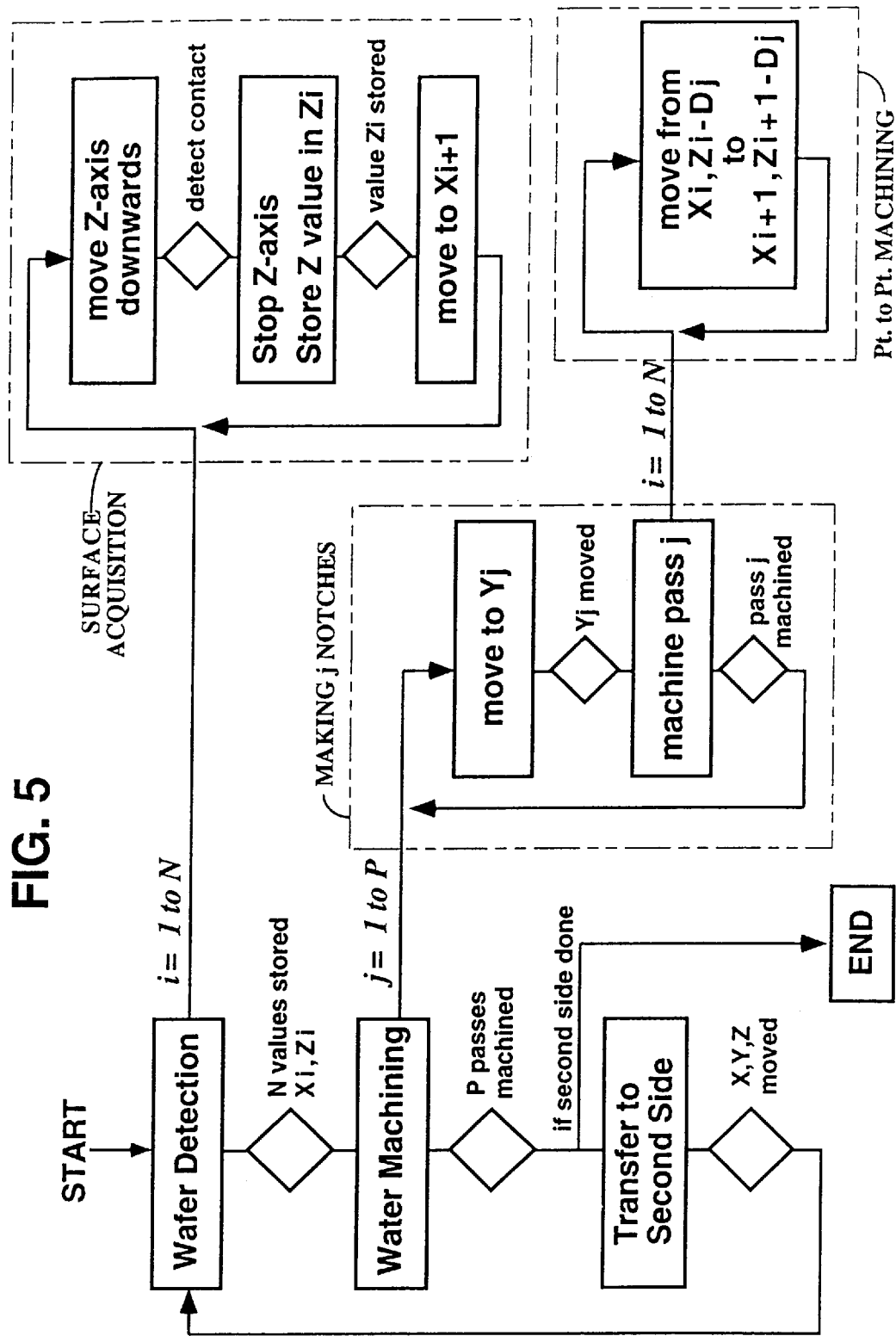
FIG. 5 is a flow diagram showing the steps of acquiring the surface and machining one or more notches.

The flow chart of FIG. 5 incorporates the major steps, as indicated by the dashed boxes, in the automatic precision machining cycles. These steps are, surface acquisition, machining of a cut having a depth 30 as shown in FIG. 4, and indexing the tool to machine another cut. The surface acquisition step has been described above. In FIG. 5, the acquisition step is shown as a loop, performed N times, thereby acquiring N points on the surface. The number of loops, N, is programmable. A larger N value is used to obtain a fitted curve which more closely approximates the actual surface shape. Stated differently, the degree of accuracy of fit is programmable.

The machining step begins by instructing the tool to move to a surface position designated $y_j$, $x_i$, where y and x define axes in a plane perpendicular to the line of downward movement of the tool. The contact point, $z_i$, $x_i$, is referenced to make a cut into the article to a point with coordinates $z_i$–$D_j$, $x_i$. That is, the tool will cut into the article to a depth $D_j$. The tool then cuts along a fitted curve connecting the points, $z_i$–$D_j$, $x_i$, and $z_i$+1–$D_j$, $x_i$+1. In one embodiment of the invention, the curve fitted between $z_i$–$D_j$, $x_i$, and $z_i$+1–$D_j$, $x_i$+1, is a straight line. The tool continues to cut along the fitted curves between contact points until cuts connecting the N contact points have been made. The end result is a notch in the surface of the article, where the depth of the notch for the entire length of the notch, is substantially equal to a preset value relative to the surface. In another embodiment, the notch depth relative to the reference surface may be controlled to a different target at different points along the length of the notch.

The cutting cycle can be repeated j times using a different starting point on the surface, a different target depth and a different set of contact points or the same set of contact points N. In this manner, a desired number of notches of different target depths may be automatically cut into the wafer. The sole preset reference required is the reference position of the tool, as noted above.

FIG. 6 illustrates a side view of an embodiment of the inventive machined wafer, precision machined according to the inventive method. Notch 25 is machined through the waveguide light paths of the wafer, thereby creating outputs for the light paths, having substantially equal mode field diameters. Notch 25 also serves as an overflow trough for adhesive. Notch 20 is machined to a depth D20 relative to surface 14, by making the number of adjacent passes required to provide a notch having a total width 23. Notch 16 is machined to a depth $D_{16}$ relative to surface 14, by making a first pass adjacent to the last pass of notch 20 and the number of adjacent passes required to reach a notch width 17. In this embodiment, notch 20 forms a support for the coated portion 22 of the fiber pigtail. Notch 16 forms a support for the bare portion of the fiber 18. The resulting alignment of the pigtail with wafer light path 12 is illustrated.

EXAMPLE

An optical wafer incorporating about 10, 1×16 optical couplers, (i.e. about 160 waveguide paths terminated near one edge of the wafer), was prepared by the ion exchange technique referenced above. The wafer dimensions were 75×53×3 mm. The waveguide paths traversed the 53 mm dimension. The maximum processing temperature of the wafer was about 350° C. The 75×53 mm surface was warped in an arcuate shape along the 75 mm dimension. The maximum deviation of the arcuate surface from a flat reference surface was about 60 microns.

Referring to FIG. 6, the 53 mm dimension of the example wafer lies in the plane of the page and the 75 mm dimension is perpendicular to the plane of the page. The surface 14 was acquired by making five tool to surface contacts along a line parallel to the 75 mm dimension. The contacts were detected by a Movomatic, Gap Control, [Meseltron SA, Division Movomatic, Av. Beauregard 18, CH-2035, Corcelles, Switzerland], ultrasonic detector and the contact positions, relative to the tool reference position, were recorded and stored as described above. A Siemens 810 M, [Siemens, Postfach 4848, D-8500, Nurnberg, Germany], controller was used to store the contact positions and calculate a linear fit for the five contact points.

Machining of the notches was carried out using a Meyer Burger, TS 42 precision slicing and grinding machine [Meyer+Burger AG Maschinenfabrik, CH-3613 Steffisburg, Switzerland]. Notch 25 was machined to expose the light guide path ends and to provide a trough for excess adhesive. Notch 16 was machined to a target depth of 122 microns. Typical deviation from target was +/−2 microns, with a maximum deviation of about 5 microns. The dimension 17 of the notch was 3 mm. Notch 20 was machined to a depth of 210 microns with tolerance similar to that of notch 16. Dimension 23 was 2 mm.

Using the inventive method, six notches were machined into the wafer in a continuous operation. Notches 25, 16, and 20 were machined and a corresponding set of three notches were machined into the wafer edge opposite the edge shown in FIG. 6. Optical waveguide fiber pigtails were glued into position on the wafer as illustrated in FIG. 6 and described fully in Dannoux, U.S. Pat. No. 4,979,970. The average insertion loss for the 1×16 coupler was measured to be about 14 dB.

The inventive method is an enabling technology for mass pigtailing or automated pigtailing of optical wafers. The fiber pigtail endfaces are brought into close alignment with the corresponding wafer light paths by means of the precision machined notches, thereby eliminating a coarse alignment step in the fiber pigtailing process. Also, it is feasible to attach fiber pigtails to the light paths of an entire wafer before segmenting the wafer into individual components. The time and cost savings of this process are described fully in EPO publication 0 544 024.

The inventive method was observed to reduce operator set up time by a factor of nine relative to the manual machining prior art method described above. Machining time was reduced by a factor of two. Furthermore, standard deviation of the cut depth was reduced by a factor of two.

Some advantages of the inventive method are:

it requires only one reference point, the reference position of the tool;

all machining is controlled relative to the acquired surface, thereby eliminating the need for a precision holding device;

an appreciable cost savings is realized over prior art methods and equipment due to simplicity of the machine and control system;

the degree of accuracy of fit is programmable; and the number of cuts and the target cut shape is programmable.

In the case of the machining of an optical wafer, having embedded light paths, there is an additional inventive machining feature. Compensation for the variation of embedded depth of the light paths may be made by modifying the step of acquiring the surface. The modification includes propagating light through the embedded light path and detecting the light emanating from the light path output with a movable detector whose position relative to the reference surface is measured. The location of the embedded light paths relative to the reference surface is included with the contact point data in the computer. In calculating the fitted surface, the computer is programmed to take into account the relative light path location, thereby compensating for the variation in depth of the embedded light path.

Although specific embodiments of my invention have hereinbefore been disclosed and described, it will be understood that the scope of my invention is nevertheless to be defined by the following claims.

I claim:

1. A machined optical wafer having a surface and having waveguide paths embedded at a depth beneath said surface, wherein at least a portion of said surface is non-uniform, characterized by, at least one machined cut, having a width, a length and a depth, made into said surface, wherein, at least at designated points, said cut depth relative to said non-uniform surface is substantially constant along said length and said cut is machined through said waveguide paths.

2. The optical wafer of claim 1, characterized in that said cut is a notch and said notch depth is about 120 microns.

3. The optical wafer of claim 1, characterized in that it has at least two said cuts, said cuts are notches, comprising a first and a second notch machined into said surface of said wafer.

4. The optical wafer of claim 3, characterized in that said first and second notches are adjacent, thereby forming a compound notch having a first and second depth and a width which is the sum of said widths of said first and second notches.

5. The optical wafer of claim 4, characterized in that said first depth is greater than said second depth and said first notch is machined into an edge of said article, whereby said compound notch forms two ascending steps extending along said edge.

* * * * *